United States Patent
Yoshitoshi et al.

(10) Patent No.: US 6,575,198 B2
(45) Date of Patent: Jun. 10, 2003

(54) METHOD OF CONNECTING TWO ELONGATED PORTIONS OF METALLIC PLATE, METHOD OF MANUFACTURING EXHAUST PIPE OF TWO-PASSAGE CONSTRUCTION, AND EXHAUST PIPE OF TWO-PASSAGE CONSTRUCTION

(75) Inventors: Nobuyuki Yoshitoshi, Shizuoka-ken (JP); Hiroto Yanagibayashi, Shizuoka-ken (JP); Hirokazu Shirai, Shizuoka-ken (JP); Akihiro Suzuki, Shizuoka-ken (JP); Noriyuki Sato, Shizuoka-ken (JP); Takeshi Sasagase, Shizuoka-ken (JP); Fumio Hosoda, Shizuoka-ken (JP); Kazuo Ishii, Tochigi-ken (JP); Masayuki Uegane, Tochigi-ken (JP); Takeshi Munemura, Tochigi-ken (JP); Yoshihiko Eguchi, Tochigi-ken (JP)

(73) Assignees: Kabushiki Kaisha Yutaka Giken, Hamamatsu (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/742,280

(22) Filed: Dec. 22, 2000

(65) Prior Publication Data

US 2001/0037836 A1 Nov. 8, 2001

(30) Foreign Application Priority Data

| Dec. 24, 1999 | (JP) | ................................. | 1999-366749 |
| Apr. 10, 2000 | (JP) | ................................. | 2000-107839 |
| Jul. 6, 2000 | (JP) | ................................. | 2000-204895 |

(51) Int. Cl.$^7$ ................................................. F16L 9/18
(52) U.S. Cl. ........................ 138/115; 138/169; 138/170; 138/171
(58) Field of Search ................................. 138/115, 171, 138/170, 169

(56) References Cited

U.S. PATENT DOCUMENTS

| 2,655,181 | A | * | 10/1953 | Cooper | ........................ | 138/115 |
| 3,110,754 | A | * | 11/1963 | Witort et al. | ................ | 138/114 |
| 3,625,258 | A | * | 12/1971 | Phelps | ........................ | 138/115 |
| 5,186,251 | A | * | 2/1993 | Joshi | ........................ | 138/171 |
| 5,901,988 | A | * | 5/1999 | Aihara et al. | ................ | 138/115 |
| 6,000,461 | A | * | 12/1999 | Ross et al. | .................... | 138/115 |
| 6,332,302 | B1 | * | 12/2001 | Asai | ............................ | 138/115 |
| 6,360,782 | B1 | * | 3/2002 | Yoshitoshi et al. | ......... | 138/115 |

FOREIGN PATENT DOCUMENTS

| EP | 00 128 272.2-2302 | 12/2001 |
| JP | 09-192727 | 7/1997 |

* cited by examiner

*Primary Examiner*—James Hook
(74) *Attorney, Agent, or Firm*—Armstrong, Westerman & Hattori, LLP

(57) ABSTRACT

In manufacturing an exhaust pipe of two-passage construction, a metallic plate having a first end and a second end respectively elongated in a longitudinal direction of the exhaust pipe is prepared. The metallic plate is bent into a substantially S shape in cross section. It has a diametrically extending central partition plate and a substantially semi-circular peripheral wall on each lateral side of said partition plate in such a manner that a groove of substantially V shape in cross section having a substantially closed end on a radially inner side and an open end on a radially outer side is formed at each diametrically outer portion of the partition plate. A target is provided so as to elongate along the groove in a manner to extend substantially radially outward from the closed end. A welding arc is generated between the target and a welding gun disposed on a side of the open end such that the substantially closed end and the target are welded together.

13 Claims, 10 Drawing Sheets

METHOD OF CONNECTING TWO ELONGATED PORTIONS OF METALLIC PLATE, METHOD OF MANUFACTURING EXHAUST PIPE OF TWO-PASSAGE CONSTRUCTION, AND EXHAUST PIPE OF TWO-PASSAGE CONSTRUCTION

BACKGROUND OF THE INVENTION

1. Field of the Invention

The present invention relates, in general, to a method of connecting thin metallic plate (or plates) by welding along a portion in which a single metallic plate is bent to form a joint portion for welding together or along a joint portion in which two members meet together. In particular, it relates to a method of manufacturing an exhaust pipe of two-passage construction to be used in an exhaust system of an internal combustion engine, as an example of a product manufactured by the above-described method. It also relates to an exhaust pipe of two-passage construction manufactured by the above and other methods, which is free from stress concentration due to pulsations of exhaust gases.

2. Description of Related Art

As a method of welding two relatively thin metallic plates for the purpose of manufacturing a product such as an exhaust pipe of two-passage construction which is suitable for connection to an exhaust manifold of a multi-cylinder internal combustion engine of a motor vehicle, there is known the following method in, for example, Published Unexamined Japanese Patent Application No. 192727/1997 as shown in FIG. 11. Namely, a single piece of metallic plate having a first end and a second end respectively elongated in a longitudinal direction of the exhaust pipe is bent substantially into S shape (i.e., a configuration of an alphabet "S"), as seen in cross section. The product thus obtained has: a partition plate or a partition wall "a" which extends in a diametrical direction and is elongated in a longitudinal direction of the exhaust pipe; and substantially semicircular peripheral wall portions b, b on each lateral side of the partition plate (i.e., on a side at a right angle to the partition plate). In this manner, independent chambers d, d are formed between the partition plate "a" and the peripheral walls b, b for passing therethrough the exhaust gases from the engine. Diametrical end portions, as seen in cross section, of the first end and the second end of the metallic plate are respectively bent radially inward to form connecting pieces c, c which lie along the partition plate "a" in its assembled state. Radially outer sides of the connecting pieces c and the partition plate "a" are welded together from a radially out side to thereby form welding beads e, e. On both longitudinal end portions of this exhaust pipe, flanges are welded for connecting the exhaust pipe to the engine on an upstream side thereof as well as to a catalyst converter on a downstream side thereof.

The exhaust pipe of two-passage construction thus formed has, however, the following disadvantages. Namely, a welding bead e which is formed in the longitudinal direction of the exhaust pipe is likely to protrude beyond the outer circumferential surface of the exhaust pipe. It follows that, when the longitudinal end portion of this welded exhaust pipe is to be inserted into the flange for fixing it to the exhaust pipe by means of welding, or when an outer pipe which is used for covering the inner pipe for the purpose of thermal insulation is swaged (or tapered to a smaller diameter) to thereby bring the two members into close contact with each other, the protruded welding bead e is an obstacle.

As a solution, the following arrangement may be considered as shown in FIG. 12A. The exhaust pipe of two-passage construction in this example is formed into a substantially S shape in cross section with a single piece of relatively thin metallic plate. It is made up of: a central partition plate "a" which forms, as seen in cross section, a diametrical line of the exhaust pipe and which extends in the longitudinal direction throughout the exhaust pipe; a substantially semicircular peripheral wall b which is formed on each lateral side of the central partition plate "a"; and a connecting piece c' which is formed on each end of the metallic plate and which is bent so as to partially overlap with the partition plate "a" in close contact with each other at each diametrically outer end of the partition plate "a." As a result, on each diametrically outer end portion of the partition plate "a", there is provided a groove (or valley) f substantially in the shape of an alphabet V. This groove f is formed by an arched end of the thin metallic plate and that arched end of the semicircular peripheral wall b which transforms (or changes) into the central partition plate "a." Welding is then made at this groove f by means of a welding gun (or a welding torch) g by generating an arc between the welding gun g and a bottom of the groove f in an attempt to integrally weld the central partition plate "a" and the peripheral wall b. In welding, however, electric discharging is likely to take place toward that portion of the mother material (peripheral wall b) which is closer to the welding gun g as shown by arrows g1, g1. As a result of this electric discharging, a lump h of welded metal (welding bead) is likely to be formed as shown in FIG. 12B in a manner not to reach deep into the groove (or the overlapped portion). A penetration bead is sometimes formed to thereby reduce the strength of the mother material. Sometimes, a penetrating hole i which breaks through the peripheral wall b is formed as shown in FIG. 12C. If an attempt is made to enlarge the width of the groove f, the cross section of the exhaust pipe approaches the shape of a flattened one, resulting in a reduction in the area of flow of the exhaust gases.

The exhaust pipe of two-passage construction as disclosed in the above-described Published Unexamined Japanese Patent Application No. 192727/1997 has still another disadvantage as explained hereinbelow. Namely, when the exhaust gases from the multi-cylinder internal combustion engine pass through a right side passage (as shown in FIG. 11), the central partition plate "a" tends to deflect toward the left side by the exhaust pressure as shown by dotted lines a1. When the exhaust gases pass through the left side passage d, the central partition plate "a" tends to deflect toward the right side by the exhaust pressure as shown by dotted lines a2. As a result, by the pulsation of the exhaust gases to pass through the two passages d, d, the partition plate "a" vibrates by alternately bending in opposite directions as shown by dotted lines a1, a2. This bending takes place with the following point serving as the point of bending, i.e., each welding portion between the connecting piece "c" and the partition plate "a" or a portion which lies on the radially inside thereof. Stresses are concentrated on these points of bending and fatigue occurs there if the vibrations continue.

In view of the above-described points, the present invention has an object of providing a method of connecting two elongated portions of a metallic plate by welding, a method of manufacturing an exhaust pipe of two-passage construction as an example of a product manufactured by the above-described method, as well as an exhaust pipe of two-passage construction manufactured by the above and other methods.

SUMMARY OF THE INVENTION

In order to attain the above and other objects, according to one aspect of the present invention, there is provided a method of connecting two elongated portions of a metallic plate, comprising the steps of: longitudinally disposing the two elongated portions at an angle so as to form a groove of substantially V shape in cross section having a substantially closed end and an open end; providing a target elongated along the groove, the target extending from the substantially closed end toward the open end; and generating a welding arc between the target and a welding gun disposed on a side of the open end above the target such that the substantially closed end of the two elongated portions and the target are welded together.

Preferably, the target is formed by bending that end of one of the elongated portions which lies on the substantially closed end toward the open end. The target may be arranged to lie on an inner surface of the other of the elongated portions, or may be formed by an independent target other than the elongated members.

According to this method, welding arc is generated in a manner directed to the target. Therefore, an accurate welding is possible, and thus even a relatively thin metallic plate can be welded without giving rise to the problem that the penetrating hole breaks through the metallic plate.

According to another aspect of the present invention, there is provided a method of manufacturing an exhaust pipe of two-passage construction, comprising the steps of: preparing a metallic plate having a first end and a second end respectively elongated in a longitudinal direction of the exhaust pipe; bending the metallic plate into a substantially S shape in cross section having a diametrically extending central partition plate and a substantially semicircular peripheral wall on each lateral side of the partition plate in such a manner that a groove of substantially V shape in cross section having a substantially closed end on a radially inner side and an open end on a radially outer side is formed at each diametrically outer portion of said partition plate; providing a target elongated along the groove in a manner to extend substantially radially outward from the closed end; and generating a welding arc between the target and a welding gun disposed on a side of the open end such that the substantially closed end and the target are welded together.

Preferably, the target is formed by bending the first end and the second end, respectively, of the metallic plate toward the radially outer end of the partition plate. The target may also be formed by doubly folding a radially outer portion of the partition plate substantially into a U shape such that a closed end of the U shape faces radially outward in the groove. The target may also be formed by providing an independent member other than the metallic plate. The target may still furthermore be arranged to lie on an inner surface, in the groove, of the partition plate.

According to this method, the welding bead can be formed accurately on the closed end of the groove.

According to still another aspect of the present invention, there is provided a method of manufacturing an exhaust pipe of two-passage construction, comprising the steps of: a) bending two longitudinally elongated metallic plates respectively into substantially semicircles with longitudinally elongated sides being further bent radially inward to thereby form inwardly inclined end portions; b) assembling the semicircles obtained in step a) together such that the inclined end portions of one semicircle face corresponding inclined end portions of the other semicircle to thereby form a substantially circular semi-product, the semi-product having on each diametrically opposite sides thereof a groove of substantially V shape in cross section with a substantially closed end on a radially inner side and an open end on a radially outer side; c) interposing a diametrically extending central partition plate along the grooves in a manner to extend diametrically outward from each of the closed ends, whereby a target is formed by a portion extended beyond each of the closed ends; and d) generating a welding arc between the target and a welding gun disposed on a side of the open end such that the substantially closed end and the target are welded together.

According to the above method, an exhaust pipe of two-passage construction can be made not by a single piece of metallic plate but by combining three different pieces of metallic plate.

According to still further aspect of the present invention, there is provided an exhaust pipe of two-passage construction comprising: a central partition plate extending in a diametrical direction and in a longitudinal direction throughout the exhaust pipe; a substantially semicircular peripheral wall on each lateral side of the partition plate so as to extend in the longitudinal direction of the partition plate, the partition plate and each of the peripheral walls jointly forming at each of radially outer portions of the partition plate a groove of substantially V shape in cross section having a substantially closed end on a radially inner side and an open end on the radially outer side; and a target elongated along the groove in a manner to extend substantially radially outward from said substantially closed end of the groove, the target being adapted to be integrally welded with the radially inner side of the groove.

Preferably, the central partition plate and the semicircular walls are formed by one metallic plate and the target is formed by bending each end of the semicircular walls. The target may be formed by doubly folding a diametrically outer portion of the partition plate substantially into a U shape such that a closed end of the U shape faces radially outward in the groove. The target may be formed by providing an independent target member other than the partition plate and the semicircular wall. The target may be arranged to lie along an inner surface, in the groove, of the partition plate, or may be constituted by extending the central partition plate beyond the closed radially inner end of the groove.

According to the above-described arrangement, there can be obtained an exhaust pipe of two-passage construction which is superior in welding quality by making use of the target.

According to a still further aspect of the present invention, there is provided an exhaust pipe of two-passage construction comprising: a central partition plate extending in a diametrical direction and in a longitudinal direction throughout the exhaust pipe; a substantially semicircular wall formed on each lateral side of the partition plate so as to extend in the longitudinal direction of the partition plate; a groove of substantially V shape in cross section formed on each diametrically outer end portion of the partition plate, the groove having a welded portion between the partition plate and a radially inner end of the groove, wherein the welded portion lies radially inward of an imaginary line of an inner circumference of the semicircular wall.

Preferably, the partition plate has a larger bending rigidity at a central portion thereof than at both radially outer portions thereof. The partition plate and the semicircular walls may be formed by a single piece of metallic plate. The central portion of the partition plate may have a larger thickness that the remaining portion of the exhaust pipe. The partition plate may also have a plurality of reinforcing ribs elongated in the diametrical direction of the partition plate, the reinforcing ribs being disposed at a longitudinal distance from each other. The groove preferably satisfies a condition of j/W<2, wherein j is a depth from a diametrically outer end of the groove to a connecting portion and W is a maximum width of the groove. Otherwise, the groove of substantially V shape satisfies a condition of L/D≧0.05, wherein D is an imaginary inner diameter of the exhaust pipe and L is a distance from D to a connecting portion.

According to this arrangement, there can be obtained an exhaust pipe of two-passage construction which is less subjected to the stresses due to the pulsations of the exhaust gases. If the groove is formed to satisfy the above conditions, welding becomes easy with a particular kind of welding gun.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 12A through 12C are sectional views of an exhaust pipe of two-passage construction before improvement of the present invention has been made, wherein FIG. 12A is a sectional view showing the occurrence of welding arcs, FIG. 12B is a sectional view of an incomplete welding beam, and FIG. 12C is a sectional view showing a partition plate broken by overpenetration of a welding arc.

DETAILED DESCRIPTION OF PREFERRED EMBODIMENTS

First of all, detailed explanation will now be made about preferred embodiments of the present invention of a method of connecting two elongated portions of a metallic plate as exemplified by a method of manufacturing an exhaust pipe of two-passage construction for use in an exhaust system of an internal combustion engine.

Figure 1:
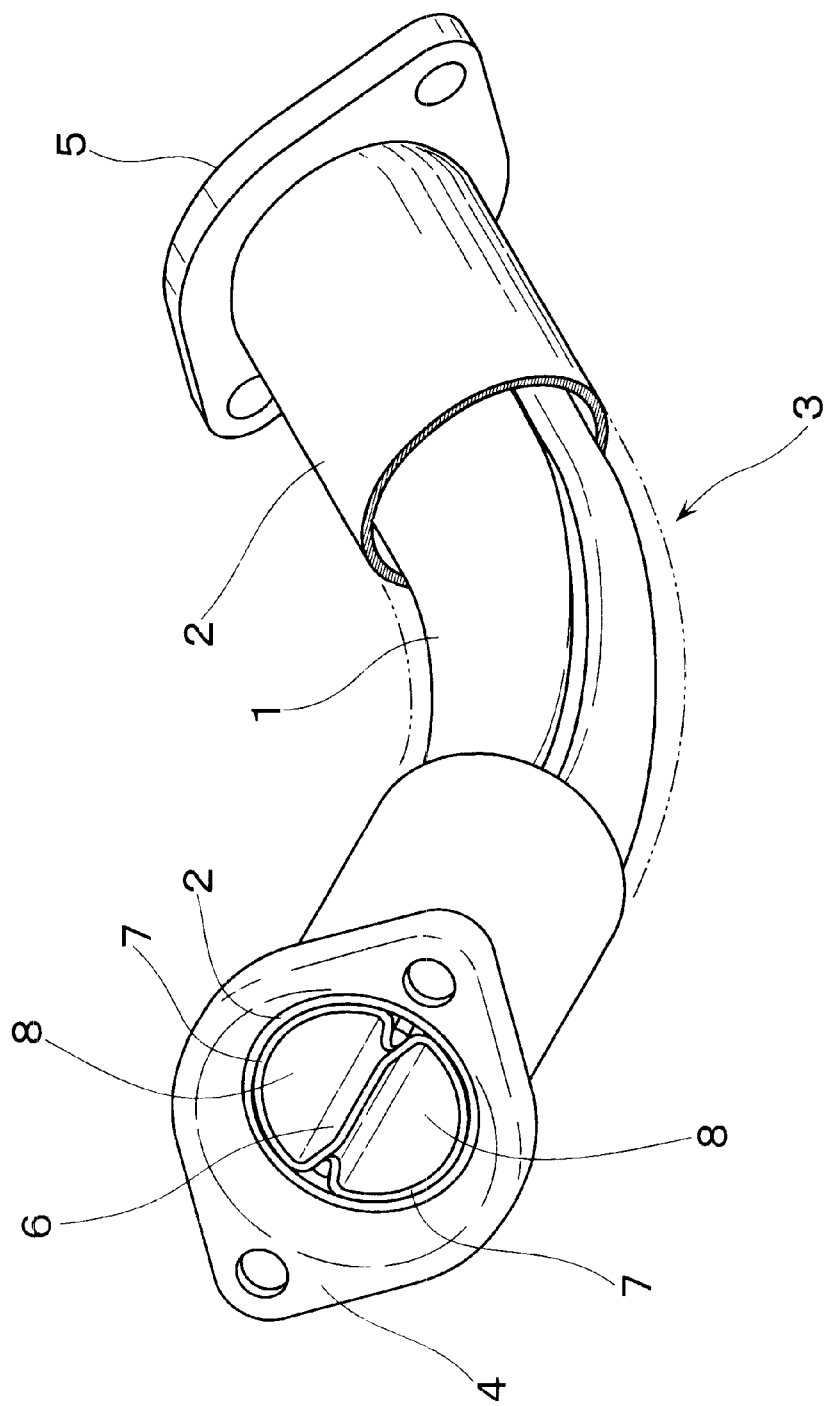
FIG. 1 is a perspective view of an exhaust pipe of two-passage construction to which the present invention is applied.

FIG. 1 shows an exhaust pipe 1 of two-passage construction which is manufactured by a method of the present invention. In the figure, reference numeral 2 denotes an outer pipe which is disposed on the exhaust pipe 1 with a thermally insulating space therebetween. The exhaust pipe 1 and the outer pipe 2 constitute an exhaust pipe assembly 3. One end of the outer pipe 2 is reduced in diameter so as to come into close contact with an outer periphery of the exhaust pipe 1. A flange 4 is fitted onto the outer periphery of the reduced outer pipe 2 for connecting the exhaust pipe assembly 3 to an exhaust manifold (not illustrated) of a multi-cylinder internal combustion engine of a motor vehicle. The other end of the outer pipe 2 has also a flange 5 for further connection to a catalyst container (not illustrated).

Figure 2A:
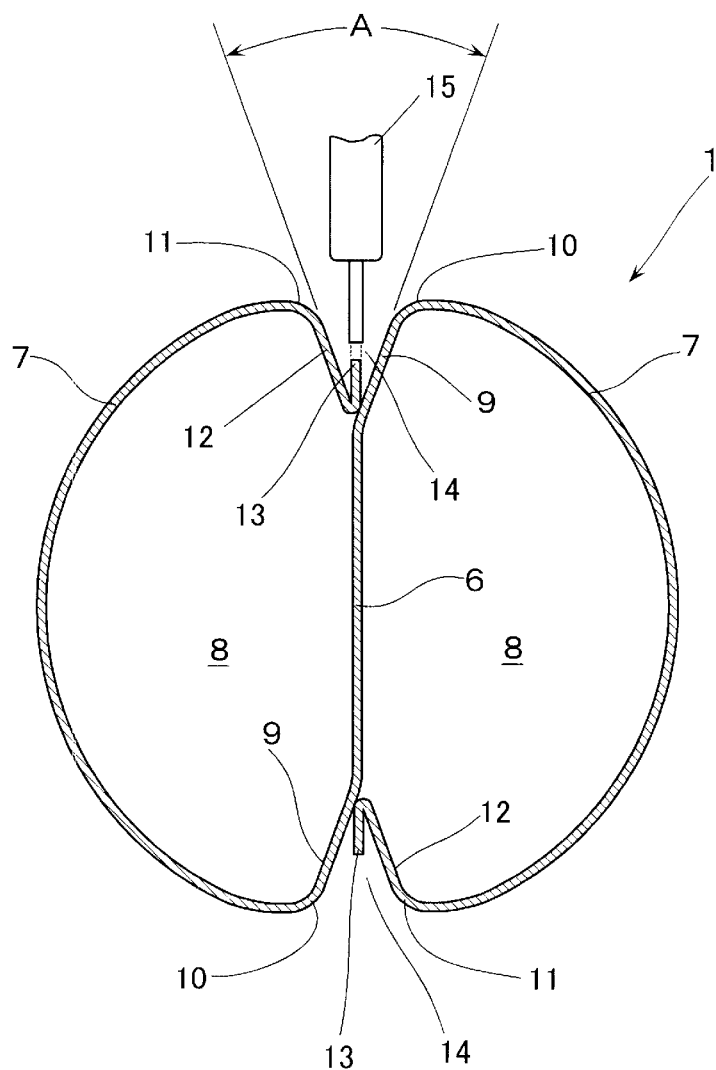
FIG. 2A is a sectional view of the exhaust pipe according to one example of the present invention and FIG. 2B is a sectional view of a welded portion in a groove.

The exhaust pipe 1 is made up of a single piece of a relatively thin metallic plate which extends in a longitudinal direction of the exhaust pipe 1 and has a width with a free end on each lateral side thereof. The metallic plate whose thickness is about 0.6 through 1.2 mm, for example, is bent so as to have a central partition plate or wall 6 which extends in a diametrical direction and is elongated in a longitudinal direction throughout the exhaust pipe 1, and two passages 8, 8 each of which is formed by the partition plate 6 and a pair of peripheral walls 7, 7 which are substantially semicircular as seen in cross section. As shown in FIG. 2A, each of the semicircular walls 7, 7 starts bending from the neighborhood of the upper and lower end portions, as seen in FIG. 2A, (i.e., diametrically outer end portions) of the partition plate 6. At each of base or end portions of the peripheral walls 7, 7 (i.e., at those portions of the partition plate 6 where the partition plate 6 and the peripheral walls 7, 7 meet each other), there are formed inclined portions 9, 9 and bent portions 10, 10, respectively. On each lateral free end portions of the metallic plate (i.e., on starting end portions of the peripheral walls 7, 7), there are formed other inclined portions 12, 12 and bent portions 11, 11, respectively. The free end portions of the metallic plate is bent substantially backward to thereby form a target 13. The term "target" denotes a portion or member which serves the function of a welding wire or a filler wire in arc welding. The two inclined portions 9, 12 thus form a substantially V-shaped valley or groove 14 on each diametrically opposite ends of the partition plate 6. The V-shaped groove 14 has a closed, or substantially closed, end on the radially inner side and an open end on the radially outer side. The angle "A" of the V-shaped groove 14 is about 40°, and the target 13 extends radially outward from a substantially closed end (i.e., radially inner end of the groove 14) radially outward along a line which evenly divides the groove 14 into half.

Figure 2B:
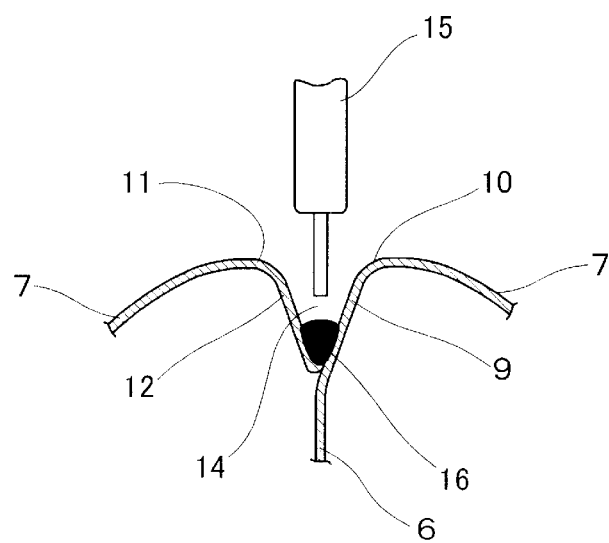

A welding gun 15 equipped with a welding electrode or a plasma electrode is disposed on the side of the open end of the groove 14 off from (or out of contact with) the target 13 such that the welding gun points to the target 13. The welding gun 15 is moved in the longitudinal direction along the target 13 (i.e., in the longitudinal direction of the exhaust pipe 1) while generating a welding arc between the target 13 and the welding gun 15. The target 13 and the portion which lies in the neighborhood of the target 13 are thus melted together to thereby form welding bead 16 along the bottom of the groove 14 as shown in FIG. 2B. Once the welding of one diametrically outer side is finished, the welding of the other groove on the diametrically opposite side is similarly welded. The target 13 can thus be seen to function as a welding wire.

Figure 3:
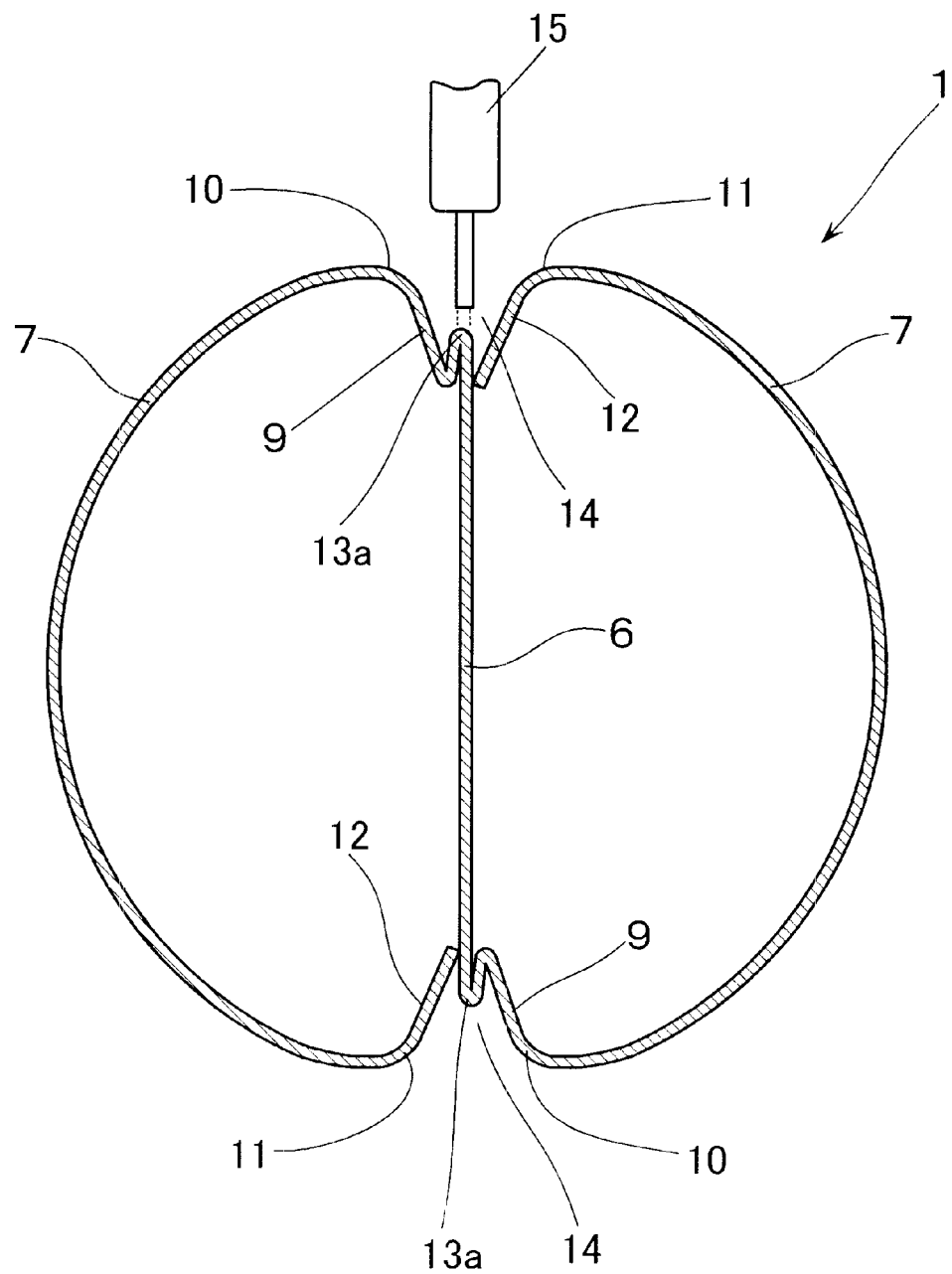
FIG. 3 is a sectional view of the exhaust pipe with a modified example of a target of FIG. 2A.

As modified examples of the target 13, the following arrangement may be employed. Namely, as shown in FIG. 3, instead of bending the free end portions of the metallic plate substantially backward as in FIG. 2A, a target 13a is formed by doubly folding a diametrically outer end portion of the partition plate 6 substantially into a U or V shape such that a closed end of the U or V shape faces radially outward in the groove. The target 13a is thus formed so as to extend substantially radially outward from the closed end on the radially inner side of the groove 14.

Figure 4:
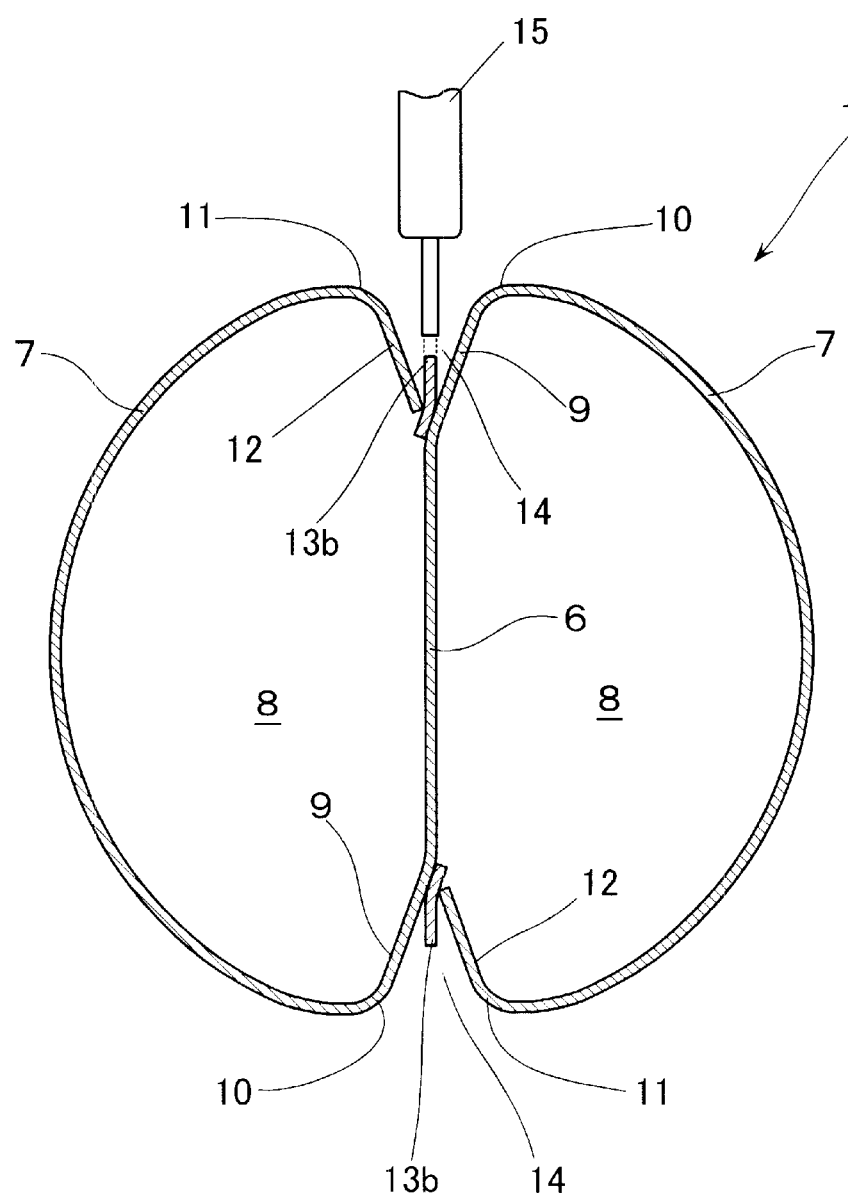
FIG. 4 is a sectional view of the exhaust pipe with another modified example of the target of FIG. 2A.

Another modified example is shown in FIG. 4. In this example, a target 13b is formed by inserting an independent metallic member (piece) in a clearance at the substantially closed end of the groove 14. The target 13b is thus formed so as to extend substantially radially outward from the substantially closed end on the radially inner side of the groove 14.

Figure 5A:
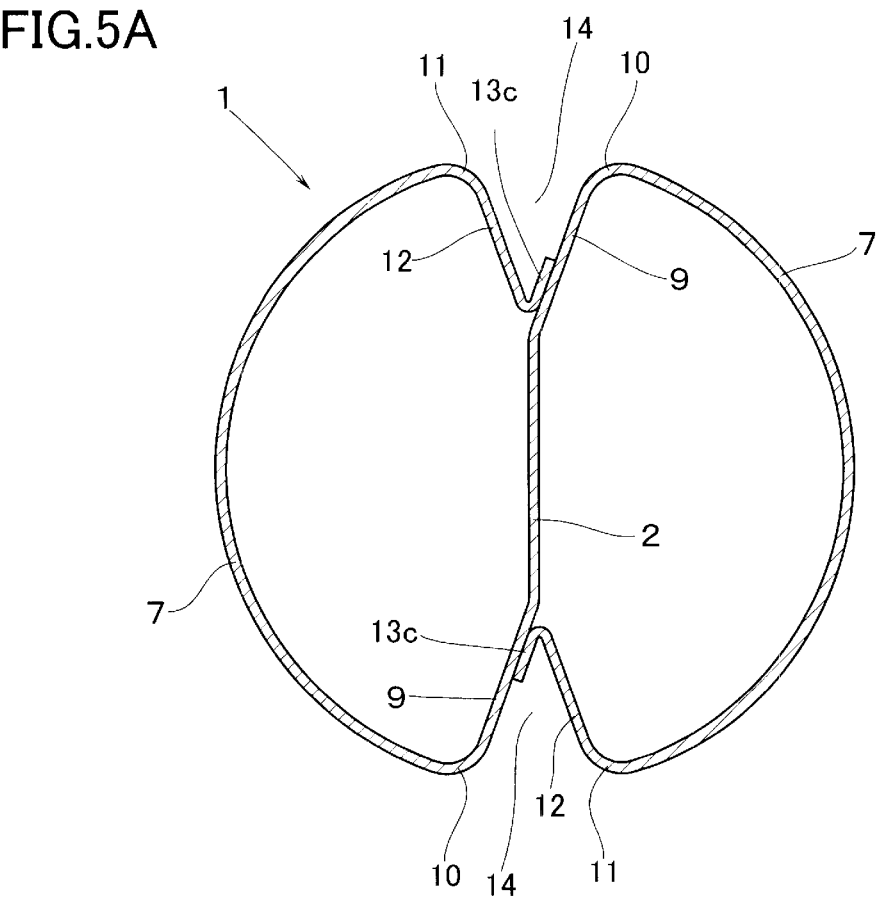
FIG. 5A is a sectional view of the exhaust pipe with still another modified example of the target of FIG. 2A
Figure 5B:
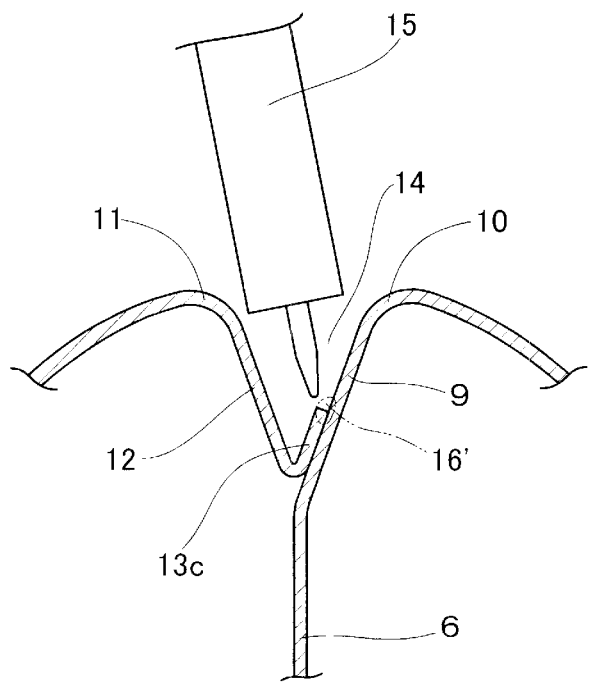
FIG. 5B is an enlarged sectional view of a portion to be welded.

Still further example of the target portion is shown in FIG. 5A. The overall arrangement of the exhaust pipe is substantially the same as that shown in FIG. 2A, the only difference being that a target 13c is arranged to lie along the inclined portion 9 toward the radially outer side. In this example, as shown in FIG. 5B, the welding gun 15 is arranged to generate a welding arc between the tip of the gun and the front end portion of the target 13c to thereby form a welding bead 16'.

Figure 6:
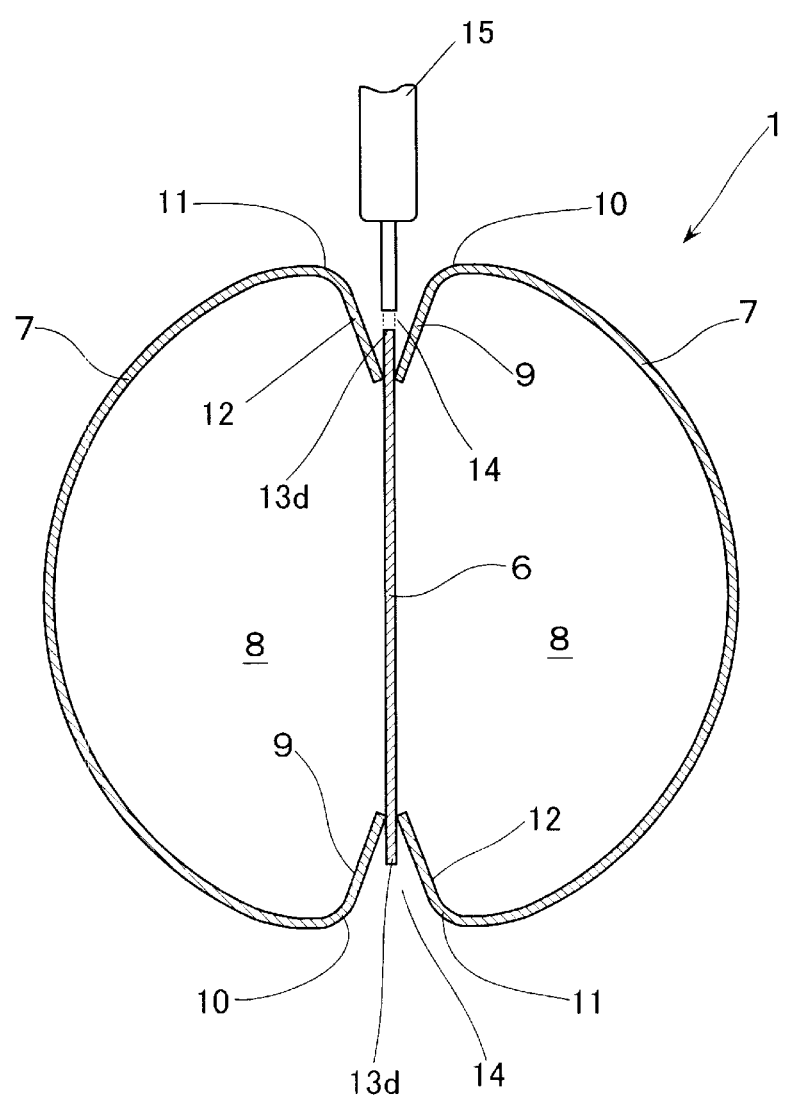
FIG. 6 is a modified example of an exhaust pipe in which the partition plate is made of a member which is different from the peripheral walls.

Still another modified example of a target 13d is formed as a part of the partition plate 6 as shown in FIG. 6. In other words, each of the diametrically outer ends of the partition plate 6 is arranged to extend beyond the substantially closed bottom end of the groove 14, whereby a portion 13c corresponding to a target is formed in a manner substantially similar to that of the above-described examples in FIGS. 2A, 3 and 4. The difference in this example from those given in the above figures is that the exhaust pipe 1 is formed not by a single piece of metallic plate but is formed by three pieces. In other words, a semicircular wall portions 7, 7 are formed in a manner symmetrical to each other with both ends being further bent radially inward. They are then placed to face each other such that a substantially closed bottom end is formed by the diametrically inner sides of the bent ends. A partition plate 6 is disposed between the inclined portions 9, 12/9, 12 through the substantially closed radially inner side of the groove 14.

An explanation has so far been made mainly about the construction of the target portion. Now, an explanation will be made about the exhaust pipe in which stress concentration on diametrically outer welded ends of the partition plate due to pulsations thereof can be prevented, the problem of pulsations being encountered in the exhaust pipe described with reference to FIG. 11.

Figure 7:
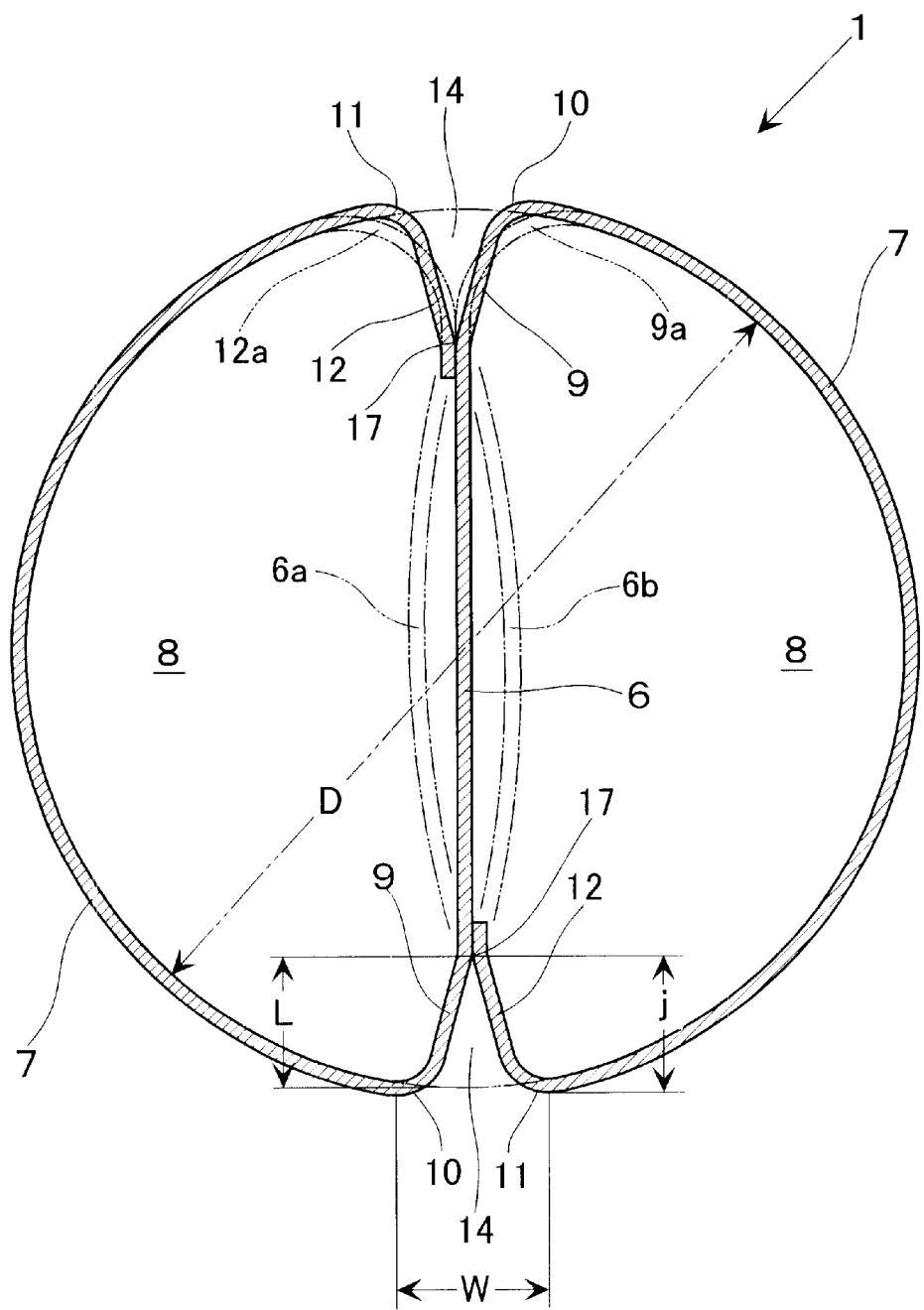
FIG. 7 is a sectional view of an exhaust pipe in which stresses of a partition plate are reduced.

The exhaust pipe of two-passage construction according to the present invention is shown in FIG. 7. The construction is basically the same as that shown in FIG. 2A or the like except for the way of connecting the diametrically outer ends of the partition plate 6 (i.e., the portion at the closed bottom end of each groove 14) and both free ends of the metallic plate (i.e., the radially inner end of each free end). In other words, the target which is an essential element in the above-described examples may, or may not, be employed in this particular example. Therefore, no detailed explanation will be made about the construction that is substantially the same as those of the above-described examples, by attaching the same numerals to the same or similar portions. In this example, the bottom of the groove 14 may be connected together by a suitable means, such as by welding, to thereby form a connecting portion 17, 17.

The imaginary inner diameter of the exhaust pipe of two-passage construction is D. The depth of the groove 14, i.e., the distance from the line of the imaginary inner diameter D to the connecting portion 17 is defined to be L. The distance between the outer portions 10, 11 of the curves at the diametrically outer ends of the groove 14 are defined to be W. The depth from the diametrically outer ends of the groove 14 to the connecting portion 17 is defined to be j.

Figure 11:
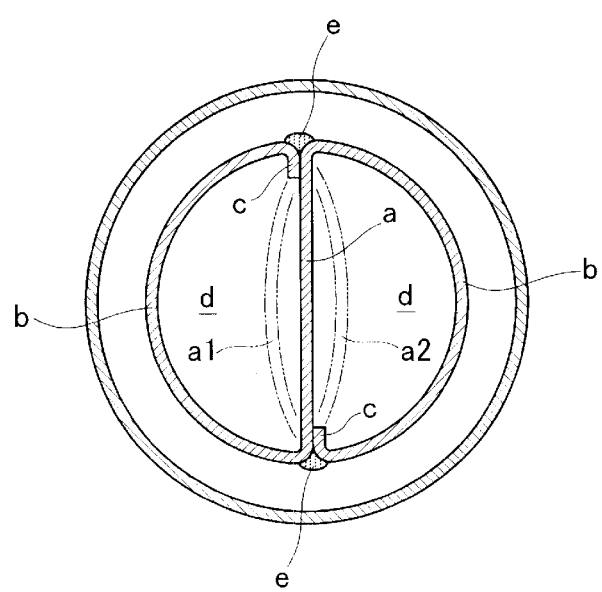
FIG. 11 is a sectional view of a conventional exhaust pipe of two-passage construction.
Figure 12A:
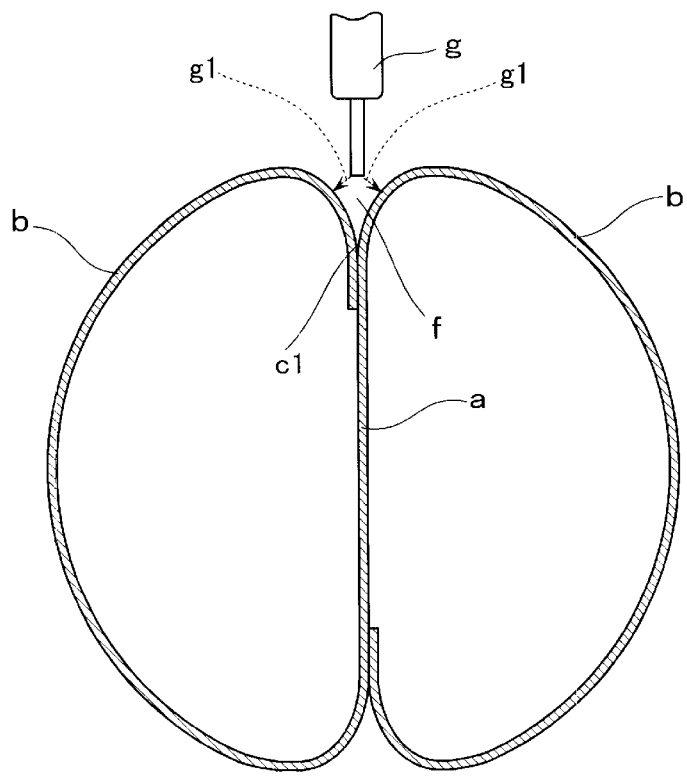
Figures 12B, 12C:
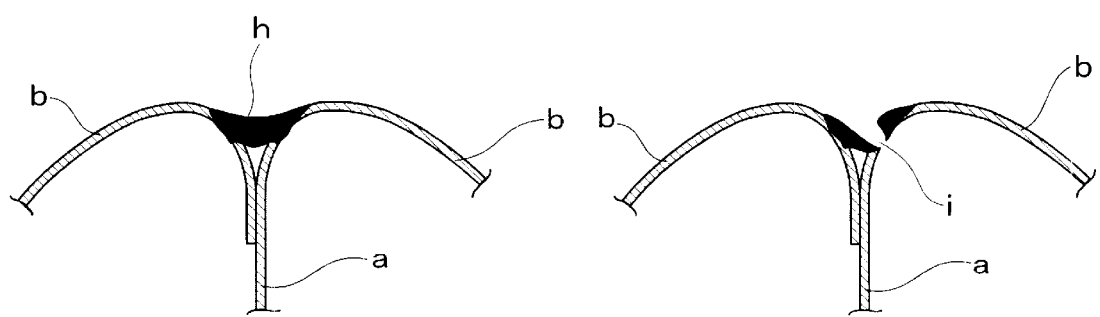

In this arrangement, when the exhaust gases alternately pass through the two passages 8, 8, the pulsation occurs to thereby cause the changes in the pressure in the passages 8, 8. As a result, due to this pressure difference, the partition plate 6 deflects as shown in imaginary lines 6a, 6b in FIG. 7. Namely, this deflection is repeated by bending the partition plate 6 from the high-pressure side toward the low-pressure side with the neighborhood of the connected portions 16, 16 as points of bending. As compared with the conventional one as shown in FIG. 11, the diametrical length of this partition plate 6 thus becomes smaller in length by an amount of 2 times the amount L which is the distance between the point of contact of the partition plate 6 and the peripheral wall 7 and the radially innermost position of contact. The area of the partition plate 6 of receiving pressure thus becomes smaller and consequently the total pressure to be operated onto the partition plate 6 becomes smaller. The bending in the neighborhood of the connected points of contact becomes smaller and, further, the wall portions in the groove 14 also allows to bend to some degree as shown by imaginary lines in FIG. 7. As a consequence, the bending stresses and stress concentration in the neighborhood of the connected points 17, 17 are alleviated, with the result that the durability of the partition plate 6 is increased.

By the way, the inclined portions 9, 9 and bent portions 10, 10, which together form the respective grooves 14, 14, shall preferably be arranged as follows. Namely, the inclined portions 9, 9 are formed into a plane (i.e., having a relatively straight line), and the bent portions 10, 10 are formed into curved portions which do not form the continuation of the inclined and straight portions 9, 9, which is different from continuously formed curved portions 9a, 12a as shown by imaginary lines in FIG. 7. In this arrangement, the cross-sectional area of the exhaust-gas flow can be kept larger.

Figure 8:
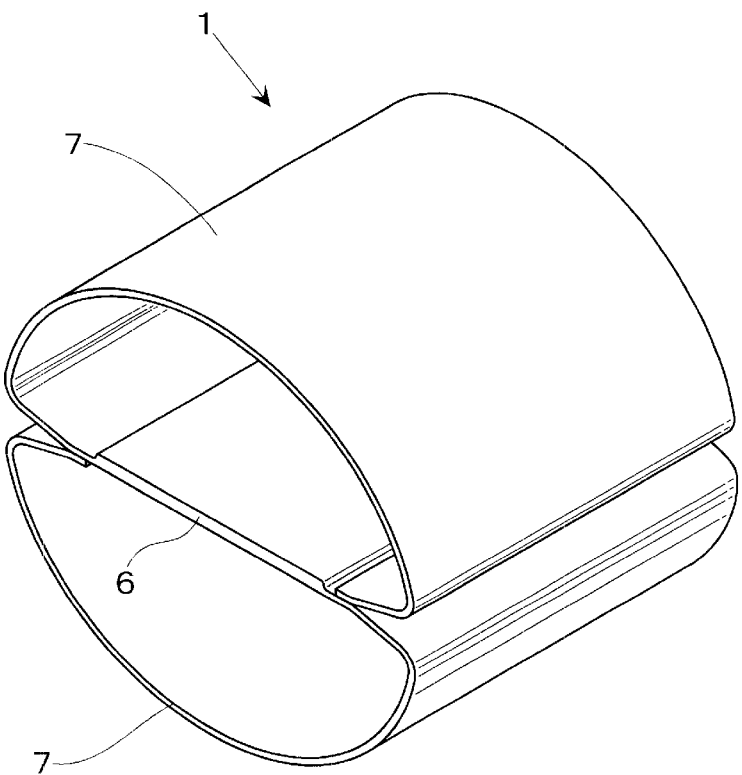
FIG. 8 is a perspective view of an exhaust pipe in which the partition plate has a reinforced construction.

Further, as shown in FIG. 8, the central wall 6 may be formed in a thicker plate than the remaining portion of the exhaust pipe. According to this arrangement, a higher bending rigidity can be secured in the central portion of the partition plate 6. The deflection of the partition plate 6 is thus reduced and the stresses can accordingly be reduced.

Figure 9:
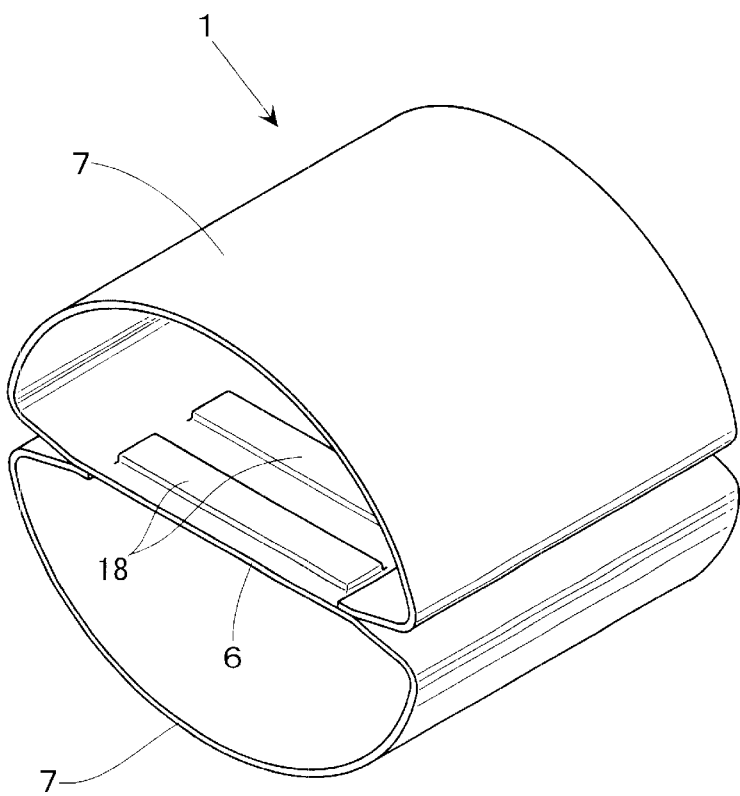
FIG. 9 is a modified example of FIG. 8.

Alternatively, as shown in FIG. 9, a plurality of reinforcing ribs 18 may be disposed on the partition plate 6 at a longitudinal distance from each other. According to this arrangement, the bending rigidity of the partition plate 6 in the diametrical direction of the partition plate can be increased. As a consequence, the deflection of the partition plate is reduced and the stresses can also be reduced. These reinforcing ribs 18 shall preferably be formed on the relevant portions of the partition plate 6 before the exhaust pipe is subjected to the bending work.

Figure 10:
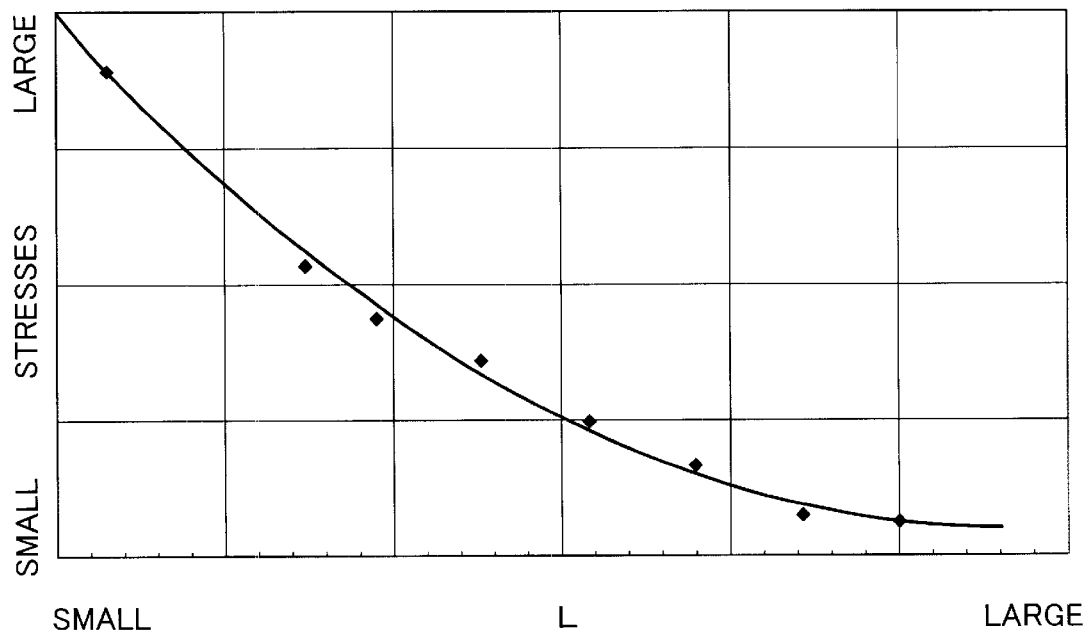
FIG. 10 is a graph showing the relationship between the stresses ratio of the partition plate and the depth of a groove.

FIG. 10 is a graph showing the stresses which occur at the connected points 16, 16 with varying distance L. It can be seen from this graph that a large depth L can reduce the stresses as compared with the example in which the distance L is made substantially zero (as in the conventional example in FIG. 11).

If, on the other hand, this distance L or j is too large, the cross-sectional area of the passages 11, 12 becomes small. If the distance W is too small, economical welding work such as MIG (Inert Metal-arc Welding) or TIG (Inert-gas Tungsten-arc Welding), or the like cannot effectively be done from the open end of the groove. As a solution, the groove in this example is formed such that each of the connected points 16, 16 lies radially inward of the imaginary line of an inner circumference of the wall (i.e., inside the line of diameter D) and that the groove satisfies a condition of j/W<2, most preferably, 0.5<j/W<2.

Otherwise, the depth of the groove 14 shall preferably be made 5% or more of the imaginary inner diameter D, i.e., is formed to meet the condition of L/D≧0.05. In this arrangement, the stresses in the neighborhood of the connected portions 17, 17 can surely be reduced. As a consequence, the thickness of the metallic plate to be used as the exhaust pipe can be made smaller in thickness, resulting in a smaller weight of the exhaust pipe. Therefore, when the engine is started, the exhaust pipe rapidly rises in temperature and the exhaust gases of high temperature can be sent to the catalyst converter in a shorter period of time. As an example of the metallic plate for manufacturing the exhaust pipe, a stainless steel (defined by JIS, Japanese Industrial Standard, as SUS 430) was used to meet the condition of L/D≧0.05. Then, it has been found that, as compared with the one in which L/D is near zero, the stresses in this example was reduced by 10% or more.

Suppose that the time in which the inlet portion of the catalyst converter reaches a catalyst active temperature is "x" seconds with the plate thickness of "t." Then, the time was found to be 0.9x second with the plate thickness of 0.8t and 0.77x second with the plate thickness of 0.6t. As can be seen from these figures, the catalyst converter can be activated at a shorter time, resulting in an improvement of the exhaust gas purifying capacity.

It is readily apparent that the above-described method of connecting two elongated portions of a metallic plate, method of manufacturing an exhaust pipe of two-passage construction, and an exhaust pipe of two-passage construction meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An exhaust pipe of two-passage construction comprising:
   a central partition plate extending in a diametrical direction and in a longitudinal direction throughout the exhaust pipe;
   a substantially semicircular peripheral wall on each lateral side of said partition plate so as to extend in the longitudinal direction of said partition plate, said partition plate and each of said peripheral walls being formed by one metallic plate and jointly forming at each of radially outer portions of said partition plate a groove of substantially V shape in cross section having a substantially closed end on a radially inner side and an open end on the radially outer side; and
   a target elongated along said groove in a manner to extend substantially radially outward from said substantially closed end of said groove, said target being adapted to be integrally welded with the radially inner side of said groove.

2. The exhaust pipe of two-passage construction according to claim 1, wherein said target is formed by bending each end of said semicircular walls.

3. The exhaust pipe of two-passage construction according to claim 2, wherein said target lies along an inner surface, in said groove, of said partition plate.

4. The exhaust pipe of two-passage construction according to claim 1, wherein said target is formed by doubly folding a diametrically outer portion of said partition plate substantially into a U shape, a closed end of said U shape facing radially outward in said groove.

5. The exhaust pipe of two-passage construction according to claim 1, wherein said target is formed by providing as a target member a member separate from said partition plate and said semicircular wall interposed between said partition plate and each said semicircular wall.

6. An exhaust pipe of two-passage construction comprising:
   a central partition plate extending in a diametrical direction and in a longitudinal direction throughout the exhaust pipe;
   a substantially semicircular wall formed on each lateral side of said partition plate so as to extend in the longitudinal direction of said partition plate; and
   a groove of substantially V shape in cross section formed on each diametrically outer end portion of said partition plate, said groove having a welded portion between said partition plate and a diametrically inner end of said groove,
   wherein said welded portion lies radially inward of an imaginary line of an inner circumference of said semicircular wall.

7. The exhaust pipe of two-passage construction according to claim 6, wherein said partition plate has a larger bending rigidity at a central portion thereof than at both radially outer portions thereof.

8. The exhaust pipe of two-passage construction according to claim 7, wherein said partition plate has a larger thickness than the remaining portion of said exhaust pipe.

9. The exhaust pipe of two-passage construction according to claim 7, wherein said partition plate has a plurality of reinforcing ribs elongated in the diametrical direction of said partition plate, said reinforcing ribs being disposed at a longitudinal distance from each other.

10. The exhaust pipe of two-passage construction according to claim 6, wherein said partition plate and said semicircular walls are formed by a single piece of metallic plate.

11. The exhaust pipe of two-passage construction according to any one of claims 6 through 9, wherein said groove of substantially V shape satisfies a condition of j/W<2, wherein j is a depth from a diametrically outer end of said groove to a connecting portion and W is a maximum width of said groove.

12. The exhaust pipe of two-passage construction according to any one of claims 6 through 9, wherein said groove of substantially V shape satisfies a condition of L/D≧0.05, wherein D is an imaginary inner diameter of the exhaust pipe and L is a distance from D to a connecting portion.

13. The exhaust pipe of two-passage construction according to any one of claims 6 through 9, wherein said groove is formed by a combination of a curved outer portion and a relatively straight portion which follows said curved portion toward diametrically inner end of said groove.

\* \* \* \* \*